United States Patent [19]

Van

[11] Patent Number: 5,706,662
[45] Date of Patent: Jan. 13, 1998

[54] METHOD FOR SHIPPING CARGO REQUIRING VENTILATION

[76] Inventor: Jerry E. Van, 630 S. Oaks Ave., Ontario, Calif. 91762

[21] Appl. No.: 542,989

[22] Filed: Oct. 13, 1995

[51] Int. Cl.$^6$ .................................................. B60H 1/32
[52] U.S. Cl. .................... 62/89; 62/239; 410/46; 414/799; 454/90
[58] Field of Search ................. 62/89, 239; 410/35, 410/39, 40, 46; 414/791.8, 791.9, 799; 454/88, 90, 91, 92

[56] References Cited

U.S. PATENT DOCUMENTS

| | | | |
|---|---|---|---|
| 2,070,044 | 2/1937 | Gilpin | 454/90 |
| 2,293,316 | 8/1942 | Stebbins | 454/91 |
| 3,092,220 | 6/1963 | Black | 454/88 |
| 3,355,054 | 11/1967 | Wilson | 220/23.6 |
| 3,430,585 | 3/1969 | Grant | 108/51 |
| 3,581,681 | 6/1971 | Newton | 108/51 |
| 3,673,812 | 7/1972 | Pierce | 62/239 |
| 3,776,145 | 12/1973 | Anderson et al. | 108/51 |
| 3,961,925 | 6/1976 | Rhoad | 62/239 |
| 4,069,927 | 1/1978 | Taylor | 214/10.5 |
| 4,213,529 | 7/1980 | Whitaker | 206/427 |
| 4,236,063 | 11/1980 | Glucksman | 219/400 |
| 4,498,595 | 2/1985 | Wilson | 211/194 |
| 4,532,774 | 8/1985 | Burns | 62/239 |
| 4,553,403 | 11/1985 | Taylor | 62/239 |
| 4,598,555 | 7/1986 | Windecker | 62/239 |
| 4,936,104 | 6/1990 | Hicke | 62/89 |
| 5,116,191 | 5/1992 | Van | 414/786 |
| 5,168,717 | 12/1992 | Mowatt-Larssen | 62/239 |
| 5,319,941 | 6/1994 | Schilling | 62/239 |

FOREIGN PATENT DOCUMENTS

| | | |
|---|---|---|
| 1904328 | 1/1969 | Germany . |
| 2300919 | 1/1973 | Germany . |
| 7605073 | 5/1976 | Netherlands . |
| 2037695 | 9/1979 | United Kingdom . |

*Primary Examiner*—William E. Tapolcai
*Attorney, Agent, or Firm*—Denton L. Anderson; Sheldon & Mak, Inc.

[57] ABSTRACT

The invention provides a method for shipping cargo, such as produce, in a typical enclosed cargo container van. The method has the following steps:

(a) loading the cargo into boxes having a pair of opposed vertical side walls, a pair of opposed vertical end walls, a top wall and a bottom wall, each box having openings in at least two different walls to allow the flow of gases through the box;

(b) stacking the boxes on individual pallet boards wherein each pallet board load has a height and a perimeter with a rectangular cross-section, the pallet board loads being prepared by securing the boxes in a plurality of horizontal tiers to individual pallet boards in such a way that a substantially equal number of boxes are secured to each pallet board in a regular, repeating pattern, the boxes being secured in each tier such that channels are formed within each tier and at least one of the vertical walls of each box on the tier abuts such a channel;

(c) placing a horizontal baffle sheet within the pallet board loads at a preselected elevation, each baffle sheet having extensions which protrude away from the perimeter of the pallet board load; and (d) loading the pallet board loads into the container van in such a way that a substantial number of the channels defined in each tier are in fluid communication with channels of adjoining pallet board loads, so that gases flowing within the enclosed space of the container van pass freely to each box, wherein the extensions of the baffle boards substantially divide the enclosed space of the container van into a lower portion and an upper portion such that gases injected into the enclosed space near the lower end of the forward end wall and subsequently withdrawn from the enclosed space near the upper end of the forward end wall flow from the forward end wall to the rearward end wall within the lower portion and return to the forward end wall from the rearward end wall within the upper portion. The invention provides a method for shipping cargo in a container van while providing ventilation throughout the cargo. The method is extremely easy and inexpensive to initiate and requires little or no modification to container vans.

20 Claims, 2 Drawing Sheets

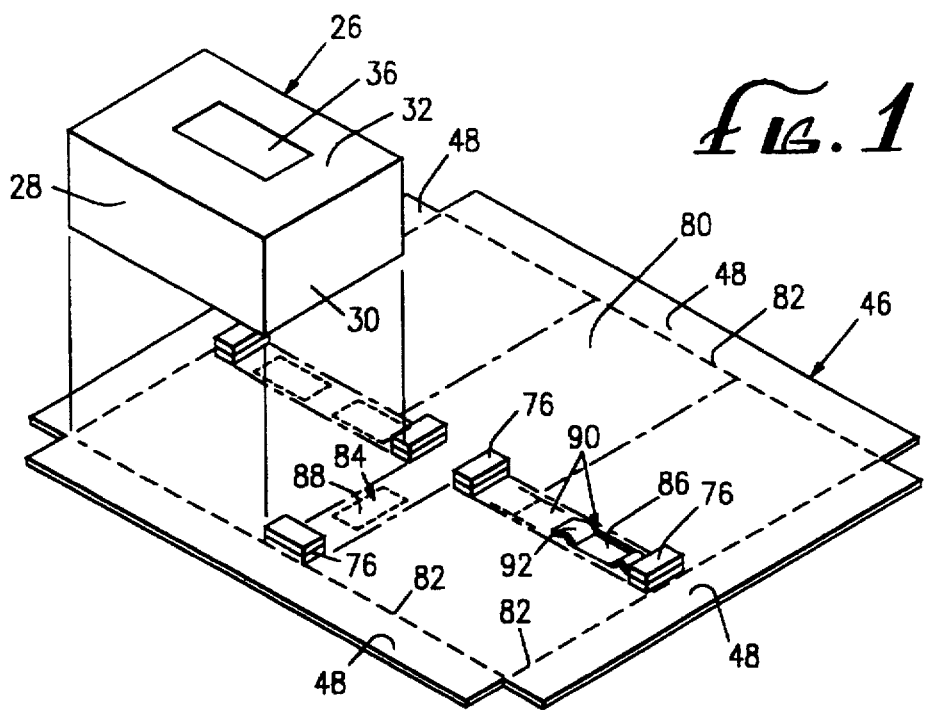
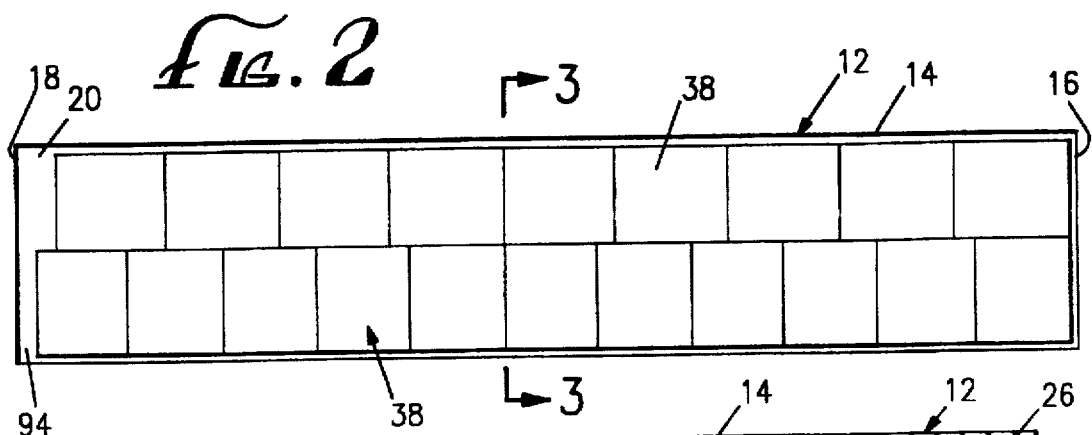
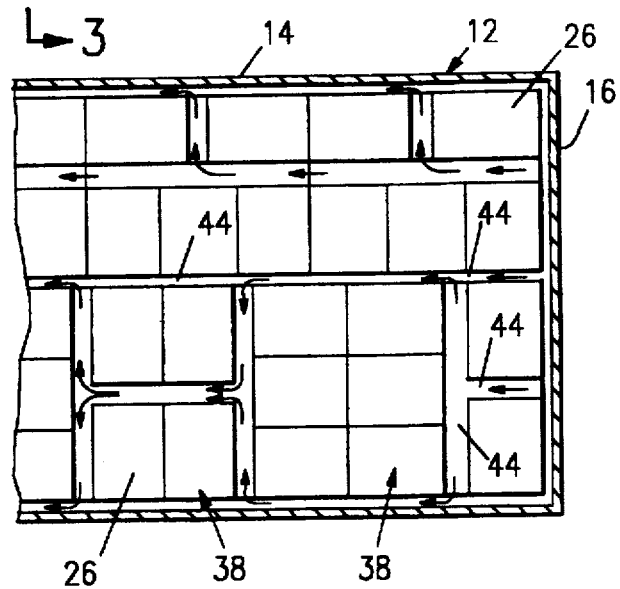

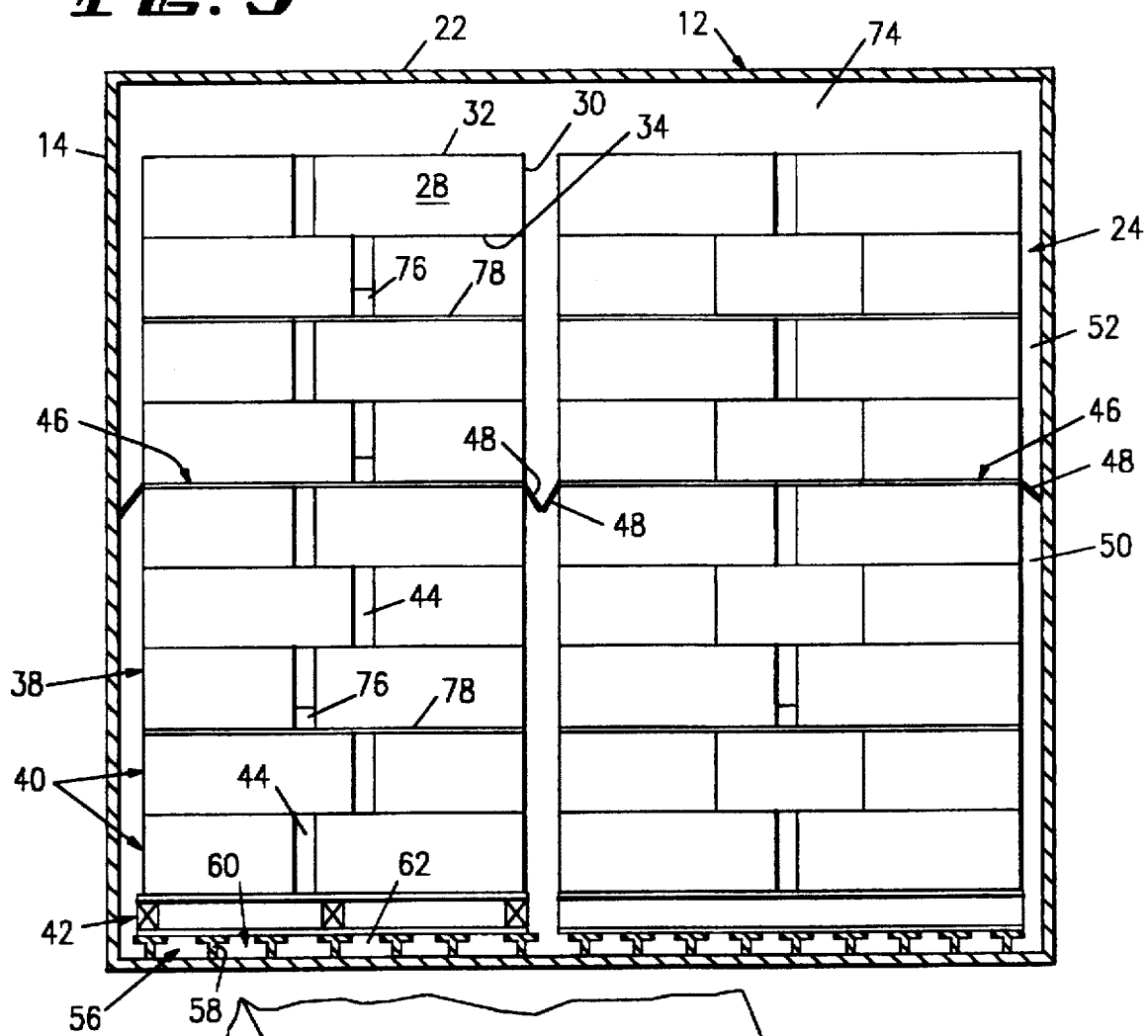
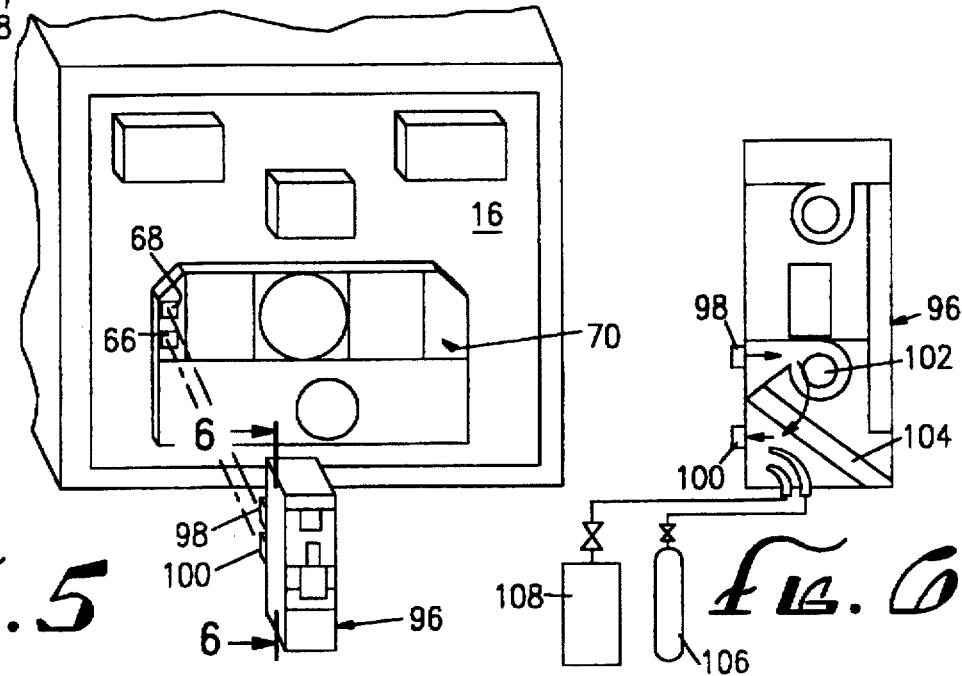

METHOD FOR SHIPPING CARGO REQUIRING VENTILATION

FIELD OF THE INVENTION

The invention relates generally to methods for shipping cargo where the cargo requires ventilation. Specifically, the invention relates to methods for shipping cargo requiring ventilation, such as fresh produce, in container vans.

BACKGROUND OF THE INVENTION

Various kinds of cargo is preferably shipped in a manner whereby the cargo is continuously ventilated by the circulation of ventilating gases. For example, where the cargo needs to be refrigerated, it is desirable to be able to circulate chilled air throughout the cargo. Also, where the cargo consists of fresh produce, it is frequently desirable to be able to circulate gaseous ripening agents and/or insecticides throughout the cargo.

Also, some produce, such as green bananas, emit gases as they ripen. Such gases tend to accumulate and create pressure. Such pressure creates additional heat which, in turn, tends to accelerate the ripening process (and results in the additional emission of gases). Thus, if the gases are not promptly exhausted, the fruit will ripen rapidly and unevenly. In this way, much of the fruit may overripen and spoil during shipment.

Most cargo is now shipped in cargo container vans having the approximate size and shape of a conventional truck trailer. Shipment by such container vans is by far the most common method of shipping on land, sea and by rail. The popularity of shipping via cargo vans is that the cargo vans can be conveniently loaded off-site from the transportation distribution center (harbor, railhead, or truck distribution center) and transported all the way to the final destination via any one or more of several shipment modes (by sea, land or rail) without having to be unloaded and reloaded at each juncture.

Attempts to solve the need for ventilating certain cargo, therefore, revolves around methods of providing adequate ventilation within cargo container van.

The present industry standard for ventilating cargo within container vans is to stack the cargo on individual pallet boards, load the pallet boards into container vans having some form of grating for a floor, then injecting ventilation gases into the cargo van through the grating in the floor near the forward end wall and finally withdrawing the gases from the container van near the top of the forward end wall.

This conventional method of ventilating the cargo vans is not very effective. The problem is that once cargo gets stored in the container van, circulation of the ventilation gases throughout the cargo van is problematic and will differ radically from cargo to cargo, depending upon the distribution of the cargo within the van. Where the cargo vans are packed relatively tightly, virtually no ventilation gases will flow through the cargo. Ventilation gases will merely flow around the cargo.

In U.S. Pat. No. 5,116,191, the inventor proposed a method for stacking boxes on a pallet board which would provide ventilation channels within the pallet board load, and therefore provide an opportunity for ventilation gases to reach all of the cargo. While this method was an important step in solving the problem of ventilating cargo in cargo vans, significant problems have remained.

The most important of these problems is that ventilation gases are almost always injected and withdrawn from the cargo van at the forward end wall. This is because it is a practical necessity to locate the compressor equipment proximate to the semi-tractor when the cargo is transported over land. Because the ventilation gases are both injected into and withdrawn from the cargo van at the forward end wall, circulation of the ventilation air to the rearward end of the cargo van is often nonexistent.

Accordingly, there is a need for a simple and inexpensive method for ventilating cargo during shipment in cargo container vans which will provide uniform ventilation to all of the cargo. To be practical, such method must be readily applicable to existing shipping equipment.

SUMMARY OF THE INVENTION

The invention satisfies this need. The invention provides a method for shipping cargo in a container van while delivering ventilation throughout the cargo. The method is extremely easy and inexpensive to initiate and requires little or no modification to container vans.

The invention is a method of shipping cargo in an enclosed, elongated cargo container van comprising the following steps:

(a) loading the cargo into boxes;

(b) loading the boxes onto pallet boards in a regular, repeating pattern wherein each tier of boxes on the pallet board contains at least one ventilation channel;

(c) disposing a horizontal baffle sheet within the pallet board loads at a preselected elevation, the baffle sheets each having extensions which protrude away from the perimeter of the pallet board load; and (d) loading the pallet board loads into the container van in such a way that a substantial number of the ventilation channels defined within each tier are in fluid communication with channels of adjoining pallet board loads, so that gases flowing within the enclosed space of the container van pass freely to each box;

wherein, the extensions of the baffle boards substantially bifurcate the enclosed space within the container van into a lower moiety and an upper moiety so that gases injected into the container van near the lower portion of the forward end wall and subsequently withdrawn from the container van near the upper portion of the forward end wall flow in substantial portion from the forward end wall to the rearward end wall within the lower moiety and return to the forward end wall from the rearward end wall within the upper moiety.

In a typical container van, the pallet board loads will have about 9 tiers. In one embodiment of the invention, each tier contains five boxes.

The boxes in each tier can be secured with spacing elements disposed in fixed relationship to one another by a rigid structure.

In a typical embodiment, the baffle sheets are rectangular cardboard sheets having rectangular flaps extending away from each of the four sides. The flaps can be scored or notched to allow them to be bent downwardly at an angle with respect to the central portion of the baffle sheet.

In preferred embodiments, the baffle sheets have at least one "pop-open" which can be either "pop-out" portions or closable openings.

In a typical embodiment, wherein the cargo container van is about 90 inches wide, pallet boards are selected which are about 40 inches wide and 48 inches long. Pallet board loads are disposed within the container van in two parallel rows, wherein in one row, the long size of the pallet boards are parallel with the sides of the container van and in the other row the short sides of the pallet boards are parallel with the sides of the container van.

In operation, the baffle sheets tend to suppress the flow of ventilation gases from the lower moiety of the container van to the upper moiety of the container van. The extension portions of the baffle sheets act to prevent ventilation gases from flowing around the pallet board loads from the lower moiety to the upper moiety. In embodiments having "pop-opens," the operator can provide one or more openings in some or all of the baffle sheets to allow a controlled flow of ventilation gas from the lower moiety of the container van to the upper moiety.

One advantage of the invention is that it allows the shipper of certain produce, such as green bananas, to ripen the bananas during shipment. This is usually done by injecting a ripening agent into the ventilation gases. The invention provides a method for uniformly distributing the ripening agent to all of the produce. Where the ripening process generates so much additional heat that the existing refrigeration unit affixed to the cargo van is inadequate to maintain proper temperature of the cargo, the invention further provides a simple, easy and inexpensive method of providing additional cooling to the cargo using an auxiliary refrigeration unit.

DESCRIPTION OF DRAWINGS

These and other features, aspects and advantages of the present invention will become better understood with reference to the following description, appended claims and accompanying drawings where:

FIG. 1 is a perspective view of a baffle sheet useful in the invention;

FIG. 2 is a top cut-away view of a cargo container van loaded in a way useful in the invention;

FIG. 3 is a cross-sectional view of the cargo van shown in FIG. 2, taken along line 3—3;

FIG. 4 is a detail cut-away top view of the container shown in FIG. 2;

FIG. 5 is a detailed perspective view of the forward end wall of the container shown in FIG. 2, to which is installed an auxiliary refrigeration unit; and FIG. 6 is a cut-away side view of the auxiliary refrigeration unit shown in FIG. 5, taken along line 6—6.

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

The invention is a method for shipping cargo in an enclosed, elongated cargo container van 12. Typically, the container van 12 has opposed vertical side walls 14, a forward end wall 16, a rearward end wall 18, a horizontal floor 20 and a horizontal roof 22 so as to form an enclosed space 24. The method comprises the steps of:

(a) loading the cargo into boxes 26 having a pair of opposed vertical side walls 28, a pair of opposed vertical end walls 30, a top wall 32 and a bottom wall 34;

(b) preparing a plurality of pallet board loads 38 wherein each pallet board load 38 has a height and a perimeter with a rectangular cross-section, the pallet board loads 38 being prepared by securing the boxes 26 in a plurality of horizontal tiers 40 to individual pallet boards 42 in such a way that a substantially equal number of boxes 26 are secured to each pallet board 42 in a regular, repeating pattern, the boxes 26 being secured in each tier 40 such that channels 44 are formed within each tier 40 and at least one of the vertical walls 28, 30 and 32 of each box 26 on the tier 40 abuts such a channel 44;

(c) disposing a horizontal baffle sheet 46 within a substantial number of the pallet board loads 38 at a preselected elevation, each baffle sheet 46 having extensions 48 which protrude away from the perimeter of the pallet board load 38; and (d) loading the pallet board loads 38 into the container van 12 in such a way that a substantial number of the channels 44 defined in each tier 40 are in fluid communication with channels 40 of adjoining pallet board loads 38, so that gases flowing within the enclosed space 24 of the container van 12 pass freely to each box 26;

wherein the extensions 48 of the baffle sheets 46 boards substantially bifurcate the enclosed space 24 of the container van 12 into a lower moiety 50 and an upper moiety 52 such that gases injected into the enclosed space 24 near the lower portion of the forward end wall 16 and subsequently withdrawn from the enclosed space 24 near the upper portion of the forward end wall 16 flow in substantial portion from the forward end wall 16 to the rearward end wall 18 within the lower moiety 50 and return to the forward end wall 16 from the rearward end wall 18 within the upper moiety 52.

The term "substantial" as used in this application is relevant to the particular total quantity involved. In general, use of the term "substantial" means greater than about 40% of the overall number of the quantity at issue.

Typically, each box 26 has openings 36 in at least two different walls to allow the flow of gases through the box 26. Alternatively, each box 26 can have suitable perforations to allow an opening 36 to be created in one or more walls of the box 26 when such opening is desired.

The invention is ideal for a typical "hi-cube" cargo container van 12 which is about 90 inches wide and about 96 inches high. Cargo container vans 12 typically come in any of a variety of lengths, the most typical being about 40 feet and about 43 feet.

Ventilated cargo vans 12 typically have a "T" floor 56 as shown in FIG. 3, wherein T-shaped members 58 which form the floor provide a grating 60 upon which cargo is loaded. This grating 60 provides gas passages 62 to allow gas injected below the grating 60 to circulate up through the grating 60 and into the cargo.

In ventilated cargo container vans 12, the cargo container van 12 typically comprises a gas circulating fan attached to the external side of the forward end wall 16 of the container van 12. The circulating fan generally has an intake port 66 for receiving air from the atmosphere and an exhaust port 68 for discharging gases from the container van 12. In a refrigerated container van 12, the circulating fan is incorporated into a primary refrigeration unit 70 which is attached to the external side of the forward end wall 16 of the container van 12. The circulating fan is configured to circulate intake air past refrigeration coils within the primary refrigeration unit 70 to cool the air prior to being injected into the cargo container van 12.

In a typical cargo container van 12, ventilation gases are injected near the base of the forward end wall 16 and are withdrawn from the cargo container van 12 near the top of the forward end wall 16.

The boxes 26 used in the invention are typically parallelepipid structures, having six rectangular sides 28, 30, 32, 34 and 36. The opening 36 in the boxes 26 can be defined within any of the six walls 28, 30, 32, 34 and 36. A typical shipping box 26 for green bananas has openings 36 centrally defined within the bottom wall 34 and in the top wall 32. The size of the boxes 26 is not particular critical, so long as the boxes 26 can be palletized to form the pallet board loads 38 having internal ventilation channels 44. Typically, this means that, for a given ventilation channel width, the length and width of the boxes 26 must be sized to match the size of the pallet boards 42.

The height of the boxes 26 is also not critical, so long as the boxes 26 retain sufficient rigidity so that the bottom tier 40 of boxes 26 is not crushed by the upper tiers 40. Also, the size of the boxes 26 should be calculated to provide an appropriate space 74 between the top of the pallet board loads 38 and the roof 22 of the container van 12. Typically, this space 74 is between about 10 inches and about 14 inches. A smaller space 74 will tend to inhibit the flow of ventilation gases. A larger space 74 will be unduly wasteful.

The size of the pallet boards 42 is not critical, so long as the pallet boards 42 can be loaded within the cargo van 12 with proper ventilation to the cargo and without undue waste of space. In a typical embodiment useful in the shipping of cargo in container vans 12 which are about 90 inches wide, the pallet board 42 is about 40 inches wide and about 48 inches long. This size is conveniently loaded into a cargo van 12 using the pattern shown in FIG. 2. Two parallel rows of pallet board loads 38 are disposed within the cargo container van 12. In one row, the long sides of the pallet board loads 38 are parallel with the side walls 14 of the container van 12. In the other row, the short sides of the pallet board loads 38 are parallel with the side walls 14 of the container van 12. Using this configuration, there is typically just enough width within the container van 12 to conveniently dispose the pallet board loads 38 into the container van 12, while leaving little or no wasted space along the sides of the container van 12 or between the pallet board loads 38.

The ventilation channels 44 within each tier 40 on the palletize board loads 38 are typically between about 1 inch and about 3 inches in width.

The boxes 26 may be secured within each tier 40 so as to maintain the integrity of the ventilation channels 44 with spacing elements 76 disposed in fixed relationship to one another by a rigid structure 78. Such spacing elements 76 and rigid structures 78 can be formed in a variety of ways, as more fully set forth in U.S. Pat. No. 5,116,191, which is incorporated herein (in its entirety) by this reference.

FIG. 1 of the present application illustrates a typical method of securing the boxes 26 within a tier 40 using spacer blocks 76 attached to a baffle sheet 46 so as to secure five boxes 26 in fixed relationship to one another, and two ventilation channels 44 are defined and maintained within the tier 40. FIG. 1 illustrates the spacing blocks (elements) 76 disposed in fixed relationship on a baffle sheet 46 which is substantially solid so as to minimize the upward flow of ventilation gases. Spacing elements 76 used to secure tiers 40 at elevations wherein baffle sheets 46 are not desired, will typically be substantially non-restrictive with respect to the upward flow of ventilation gases. Such typical non-restrictive spacing element articles are described in U.S. Pat. No. 5,116,191.

The baffle sheets 46 can be made from any inexpensive material which is relatively restrictive to the flow of gases. Cardboard makes an ideal material for the baffle sheets 46.

In a typical embodiment, the extension portions 48 of the baffle sheets 46 are elongate rectangular strips which protrude away from the non-extension portion 80 of the baffle sheets 46. Such an embodiment is illustrated in FIG. 1. Preferably, the extension portions 48 of the baffle sheets 46 are readily disposed at an angle with respect to the non-extension portion 80 of the baffle sheets 46. In the embodiment illustrated in FIG. 1, this is accomplished by bending the extension portions 48 downwardly (or upwardly). In the embodiment shown in FIG. 1, the dividing line 82 between the extension portion 48 and the non-extension portion 80 of the baffle sheet 46 is scored or otherwise weakened to facilitate the disposing of the extension portion 48 at an angle with respect to the non-extension portion 80.

In a typical embodiment having elongate rectangular extension portions 48, such as is illustrated in FIG. 1, the extension portions 48 are typically between about 1 and about 3 inches wide.

As discussed above, the baffle sheets 46 can also provide the rigid structure 78 for disposing spacing elements 76 in fixed relationship to one another.

In a preferred embodiment of the invention, the baffle sheets 46 comprise "pop-open" portions 84. As used herein, the term "pop-open" is meant to describe any readily openable portion which can easily be used to create an aperture 86 in the baffle sheet 46. The pop-open 84 can be a "pop-out" 88 as illustrated in FIG. 1, wherein a portion of the baffle sheet 46 is perforated or scored to allow it to be readily "popped out." The pop-open 84 can also be a closeable opening 90 such as is also illustrated in FIG. 1, such as providing a fold-outable flap 92 by scoring or perforating a portion of the baffle sheet 46 so that the flap 92 can be folded back away from the plane of the baffle sheet 46 to provide an aperture 86. Such pop-open 84 is "closeable" in that the flap of material 92 can be folded back into place within the plane of the baffle sheet 46 to substantially close off the aperture 86. Such pop-opens 84 allow the user to provide a controlled upward flow of ventilation gases through the baffle sheet 46.

In the embodiment wherein the boxes 26 in each tier 40 of the pallet board load 38 is configured as shown in FIG. 1, the pallet board loads 38 can be aligned so that ventilation gases can readily flow to each box 26 in all of the tiers 40 situated at a particular elevation. This is illustrated in FIG. 4.

Where the pallet board loads 38 are stowed within the container van 12 as shown in FIG. 2, and wherein the baffle sheets 46 are configured as shown in FIG. 1, the cross-section of the container van 12 along line 3—3 of FIG. 2 is shown in FIG. 3. As can be seen in FIG. 3, the baffle sheets 46 between tiers 5 and 6 in each pallet board load 38 effectively bifurcate the enclosed space 24 within the container van 12 into a lower moiety 50 and an upper moiety 52. The baffle sheets 46 effectively prevent upward flow of ventilation gases from the lower moiety 50 to the upper moiety 52. The extension portions 48 of the baffle sheets 46 cooperate with each other and with the walls 14 and 16 of the container van 12 to effectively seal off the spaces between the pallet board loads 38 and the spaces adjacent to the side walls 14 of the container van 12. As is illustrated in FIG. 2, it is typical in the invention to allow ventilation gases to pass from the lower moiety 50 to the upper moiety 52 in the space 94 between the rearmost pallet board loads 38 and the rearward wall 18 of the container van 12. Accordingly, it can be seen that, where ventilation gases are injected into the container van 12 near the bottom of the forward end wall 16, such ventilation gases necessarily must flow to the rearward wall 18 of the container van 12 in the lower moiety 50 and, only then, flow into the upper moiety 52 for return to the upper end wall 16—and subsequent venting via openings near the top of the upper end wall.

One significant advantage of the invention is that it allows shippers of produce to ripen the produce during shipment. This is typically accomplished with produce such as green bananas and tomatoes by mixing a ripening gas in with the ventilation gases. By use of the invention, the user is assured that produce throughout the container van 12 will be ripened at the same rate and to the same extent.

In those applications where the ripening process creates so much heat that the primary refrigeration unit 70 can no longer maintain proper temperatures within the container van 12, the invention further provides the installation of an auxiliary refrigeration unit 96 to the exterior side of the forward end wall 16 of the container van 12. The inventor has found that a simple auxiliary refrigeration unit 96 can be easily attached to existing container vans 12 without excessive expense or labor. As illustrated in FIG. 5, the auxiliary refrigeration unit 96 can be operatively attached to the container van 12 by connecting in air tight communication the intake port 98 of the auxiliary refrigeration unit 96 to the exhaust port 68 of the primary refrigeration unit 70 and connecting in air tight communication the exhaust port 100 of the auxiliary refrigeration unit 96 to the intake port 66 of the primary refrigeration unit 70. Alternatively, the auxiliary refrigeration unit 96 can be vented to the outside air and/or the intake to the auxiliary unit can be taken from the outside air. As illustrated in FIG. 6, exhaust gases from the primary refrigeration unit 70 are drawn into the auxiliary refrigeration unit 96 by means of an auxillary circulating fan 102 and are then forced past auxillary cooling coils 104 in the auxiliary refrigeration unit 96 and then back to the intake port 98 of the primary refrigeration unit 70 via the exhaust port 100 in the auxiliary refrigeration unit 96. As also illustrated in FIG. 6, a source of ripening gas 106 and/or a source of humidifying water 108 can be injected downstream of the auxillary circulating fan 102 for mixing with the ventilation or refrigeration gases flowing to the produce within the container van 12.

By using such an auxiliary refrigeration unit 96, the shipper of produce such as tomatoes and green bananas can ripen the produce during shipment without damaging the produce through uneven ripening or because of excessive heat.

The invention provides a method for shipping cargo in a container van 12 while providing ventilation throughout the cargo. The method is extremely easy and inexpensive to initiate and requires little or no modification to container vans 12.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A method for shipping cargo in an enclosed, elongated cargo container van having opposed vertical side walls, a forward end wall, a rearward end wall, a horizontal floor and a horizontal roof so as to form an enclosed space, the method comprising the steps of:

(a) loading the cargo into boxes having a pair of opposed vertical side walls, a pair of opposed vertical end walls, a top wall and a bottom wall;

(b) preparing a plurality of pallet board loads wherein each pallet board load has a height and a perimeter with a rectangular cross-section, the pallet board loads being prepared by securing the boxes in a plurality of horizontal tiers to individual pallet boards in such a way that a substantially equal number of boxes are secured to each pallet board in a regular, repeating pattern, the boxes being secured in each tier such that channels are formed within each tier and at least one of the vertical walls of each box on the tier abuts such a channel;

(c) disposing a horizontal baffle sheet within a substantial number of the pallet board loads at a preselected elevation, each baffle sheet having extensions which protrude away from the perimeter of the pallet board load; and (d) loading the pallet board loads into the container van in such a way that a substantial number of the channels defined in each tier are in fluid communication with channels of adjoining pallet board loads, so that gases flowing within the enclosed space of the container van pass freely to each box;

wherein the extensions of the baffle boards substantially bifurcate the enclosed space of the container van into a lower moiety and an upper moiety such that gases injected into the enclosed space near the lower portion of the forward end wall and subsequently withdrawn from the enclosed space near the upper portion of the forward end wall flow in substantial portion from the forward end wall to the rearward end wall within the lower moiety and return to the forward end wall from the rearward end wall within the upper moiety.

2. The method of claim 1 wherein a substantial number of the pallet board loads comprise about 9 tiers.

3. The method of claim 1 wherein a substantial number of the tiers define at least two different channels.

4. The method of claim 1 wherein a substantial number of the tiers in the pallet board loads comprise exactly 5 boxes.

5. The method of claim 1 wherein a substantial number of the tiers in the pallet board loads are secured with spacing elements disposed in fixed relationship to one another by a rigid structure.

6. The method of claim 1 wherein the baffle sheets are made from cardboard.

7. The method of claim 1 wherein the baffle sheets are generally rectangular and have elongate rectangular extensions.

8. The method of claim 1 wherein the extension portions of each baffle sheet are readily disposed at an angle with respect to the non-extension portion of the baffle sheet.

9. The method of claim 8 wherein the baffle sheet is scored to facilitate the disposing of the extension portions at an angle with respect to the non-extension portion of the baffle sheet.

10. The method of claim 1 wherein a substantial number of the baffle sheets have at least one opening.

11. The method of claim 1 wherein a substantial number of the baffle sheets have at least one pop-open.

12. The method of claim 1 wherein a substantial number of the baffle sheets have at least one pop-out.

13. The method of claim 1 wherein a substantial number of the baffle sheets have at least one closeable opening.

14. The method of claim 1 wherein a substantial number of the baffle sheets have spacer blocks.

15. The method of claim 1 wherein each box has openings in at least two different walls to allow the flow of gases through the box.

16. The method of claim 1 wherein the floor of the container van is about 90 inches wide, the pallet boards are about 48 inches long and about 40 inches wide, and the pallet board loads are disposed within the length of the container van in two parallel rows, wherein in one row the long sides of the pallet boards are parallel with the sides of the container van and in the other row the short sides of the pallet boards are parallel with the sides of the container van.

17. The method of claim 1 wherein the container van further comprises a primary refrigeration unit and an auxiliary refrigeration unit attached to the exterior of the forward end wall, both refrigeration units having an intake port and an exhaust port, the intake port of the auxiliary refrigeration unit being connected in air tight communication with the exhaust port of the primary refrigeration unit and the intake port of the primary refrigeration unit being connected in air tight communication with the exhaust port of the auxiliary refrigeration unit.

18. The method of claim 1 wherein the cargo is selected from the group of cargo consisting of bananas and tomatoes.

19. A method for shipping produce in an enclosed, elongated cargo container van having opposed vertical side walls, a forward end wall, a rearward end wall, a horizontal floor and a horizontal roof so as to form an enclosed space, the method comprising the steps of:

(a) loading the produce into boxes having a pair of opposed vertical side walls, a pair of opposed vertical end walls, a top wall and a bottom wall, each box having openings in at least two different walls to allow the flow of gases through the box;

(b) preparing a plurality of pallet board loads wherein each pallet board load has a height and a perimeter with a rectangular cross-section, the pallet board loads being prepared by securing the boxes in a plurality of horizontal tiers to individual pallet boards in such a way that a substantially equal number of boxes are secured to each pallet board in a regular, repeating pattern, the boxes being secured in each tier such that channels are formed within each tier and at least one of the vertical walls of each box on the tier abuts such a channel;

(c) disposing a horizontal baffle sheet within a substantial number of the pallet board loads at a preselected elevation, each baffle sheet having extensions which protrude away from the perimeter of the pallet board load; and (d) loading the pallet board loads into the container van in such a way that a substantial number of the channels defined in each tier are in fluid communication with channels of adjoining pallet board loads, so that gases flowing within the enclosed space of the container van pass freely to each box;

wherein the extensions of the baffle boards substantially bifurcate the enclosed space of the container van into a lower moiety and an upper moiety such that gases injected into the enclosed space near the lower portion of the forward end wall and subsequently withdrawn from the enclosed space near the upper portion of the forward end wall flow in substantial portion from the forward end wall to the rearward end wall from the rearward end wall within the lower moiety and returns to the forward end wall within the upper moiety;

wherein a substantial number of the tiers in the pallet board loads are secured with spacing elements disposed in fixed relationship to one another by a rigid structure;

wherein the baffle sheets are generally rectangular and have elongate rectangular extensions;

wherein the extension portions of each baffle sheet are readily disposed at an angle with respect to the non-extension portion of the baffle sheet;

wherein the pallet board loads are prepared so that, when the pallet board loads are disposed within the container van, the distance between the top of the pallet board loads and the roof of the container van is between about 10 and about 14 inches; and wherein the container van further comprises a primary refrigeration unit and an auxiliary refrigeration unit attached to the exterior of the forward end wall, both refrigeration units having an intake port and an exhaust port, the intake port of the auxiliary refrigeration unit being connected in air tight communication with the exhaust port of the primary refrigeration unit and the intake port of the primary refrigeration unit being connected in air tight communication with the exhaust port of the auxiliary refrigeration unit.

20. The method of claim 19 wherein a substantial number of the baffle sheets have at least one opening.

* * * * *